United States Patent
Long et al.

(10) Patent No.: US 7,442,087 B2
(45) Date of Patent: Oct. 28, 2008

(54) ELECTRICAL CARD CONNECTOR

(75) Inventors: Ji-En Long, ShenZhen (CN); Wei-Nan Kuo, Tu-cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/009,245

(22) Filed: Jan. 17, 2008

(65) Prior Publication Data

US 2008/0171459 A1 Jul. 17, 2008

(51) Int. Cl.
*H01R 24/00* (2006.01)

(52) U.S. Cl. .......................... 439/630; 439/64; 439/377

(58) Field of Classification Search ................. 439/630, 439/64, 377, 325
See application file for complete search history.

(56) References Cited

U.S. PATENT DOCUMENTS 7,329,146 B2 * 2/2008 Yang et al. .................. 439/570

2004/0235353 A1 * 11/2004 Katsumata et al. .......... 439/630
2005/0239333 A1 * 10/2005 Watanabe et al. ........... 439/630
2006/0205279 A1 * 9/2006 Pan ............................ 439/630
2007/0093138 A1 * 4/2007 Su .............................. 439/630

* cited by examiner

*Primary Examiner*—Hien Vu
(74) *Attorney, Agent, or Firm*—Wei Te Chung

(57) ABSTRACT

An electrical card connector comprises an insulative housing 10 defining a main body 11 with a plurality of passageways 12 for receiving corresponding contacts 20 therein, the sidewalls 14 substantially parallel extend forwards from the opposite sides of the main body 11 and a rear wall 16 is also formed on the top side, a plurality of contacts 20 received in the passageways 12 and each has a contact portion 201 extending above the surface of the insulative housing 10 to contact circuitry on a card, a pair of hooks 30 engage with the insulative housing 10 defining a receiving cavity 50 together with main body 11. A pair of opening 18 runs through the opposite sidewalls 14 from the top down respectively, wherein a pair of platform 19 is defined in opening 18 for carrying the planar portion 301.

2 Claims, 4 Drawing Sheets

ELECTRICAL CARD CONNECTOR

BACKGROUND OF THE INVENTION

1. Field of the Invention

The present invention relates to card connector, especially to a card connector having a supporting platform formed with the housing so as to securely support a hook attached thereto.

2. Background of the Invention

Electrical cards are known in the art and contain intelligence in the form of a memory circuit or other electronic program. Some form of card reader retrieve the information or data stored on the card. Such cards are used in many applications in today's electronic society, including video cameras, digital still cameras, smart phones, PDAs, music players, ATMs, cable television decoders, toys, games, PC adapters, multi-media cards and other electronic applications, etc.

Examples of prior art card-receiving connectors generally comprise a housing having connection contacts mounted thereon. The housing includes a main body which defines a plurality of passageways, a rear wall and a pair of sidewalls extending forwards from the opposite sides of the main body. The rear wall and the sidewalls define a receiving cavity for receiving an electrical card therein and the inner sides of the sidewalls define a recess respectively. The contacts have contact portions, which extend above the surface of the housing to contact the electrical card. A hook is hinged or pivotally mounted on the housing. An electrical card, such as a "SIM" card, is inserted into a card-receiving section defined in the hook along with the housing. When the SIM card is inserted, the card are forced against the contact portions extend above the housing for effecting an electrical connection between the circuitry of the electrical card and the connector. A reliable connection can be retained by the hook.

Unfortunately, problems continue to be encountered with the electrical card connectors mentioned above. When the hook is hinged or pivotally mounted on the housing, the horizontal strength for securing the electrical card is not strong enough; this makes the electrical card easy to move back and forth, i.e. unstable. Therefore, an improved electrical card connector is desired to overcome the disadvantages of the prior arts.

SUMMARY OF THE INVENTION

An object, therefore, of the invention is to provide a new and improved electrical card connector of the character described able to enhance the horizontal strength of the hook to stabilize the electrical card.

In order to achieve the object set forth, an electrical connector in accordance with the present invention comprises an insulative housing defining a main body with a plurality of passageways for receiving corresponding contacts therein, the sidewalls substantially parallel extend forwards from the opposite sides of the main body and a rear wall is also formed on the top side, a plurality of contacts received in the passageways and each has a contact portion extending above the surface of the insulative housing to contact circuitry on the electrical card, a pair of hooks engage with the housing defining a receiving cavity together with the main body. Each hook defines a planar portion, a curved portion and an engaging portion. A pair of opening runs through the opposite sidewalls from the top down respectively, wherein a pair of platforms is defined in the opening for carrying the planar portion.

As disclosed herein, the platform which defined in the opening support the planar portion so as to enhance the horizontal strength and retention between hook and insulative housing.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
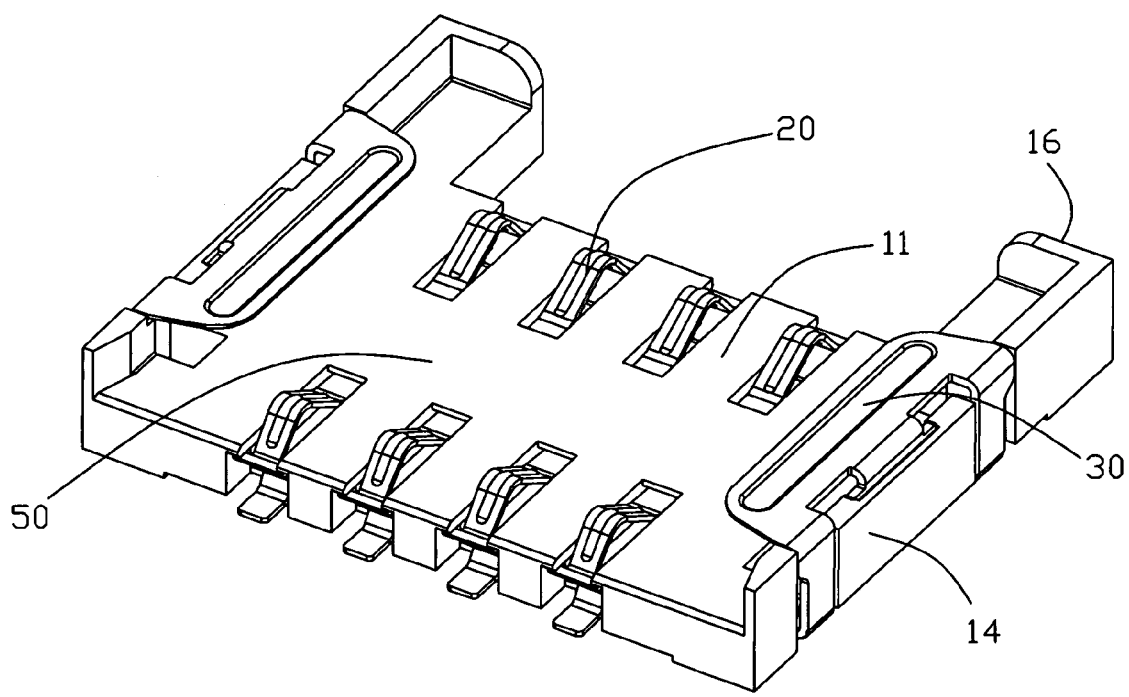
FIG. 1 is an assembled perspective view of an electrical card connector embodying the concepts of the invention.
Figure 2:
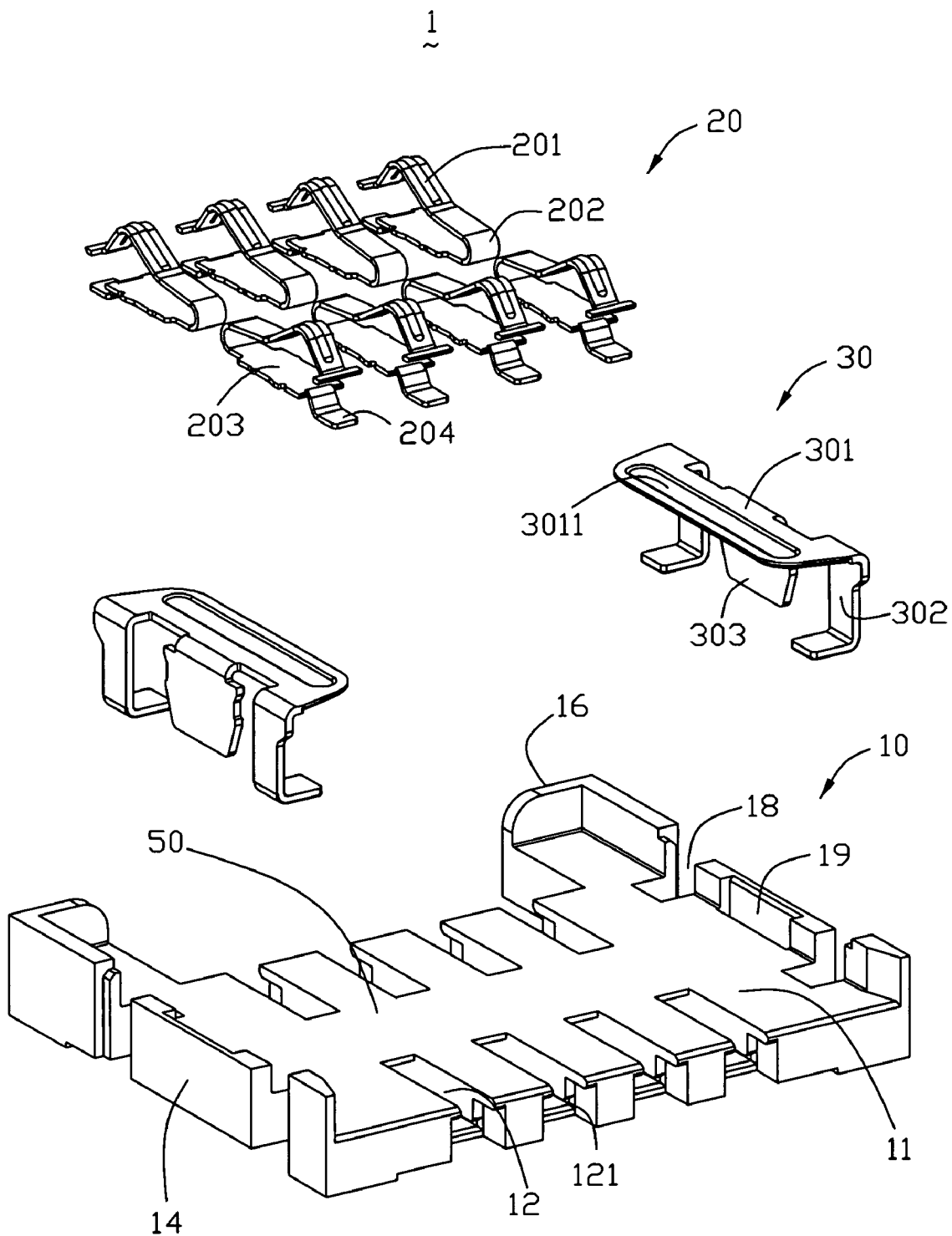
FIG. 2 is an exploded view of the electrical card connector shown in FIG. 1.
Figure 3:
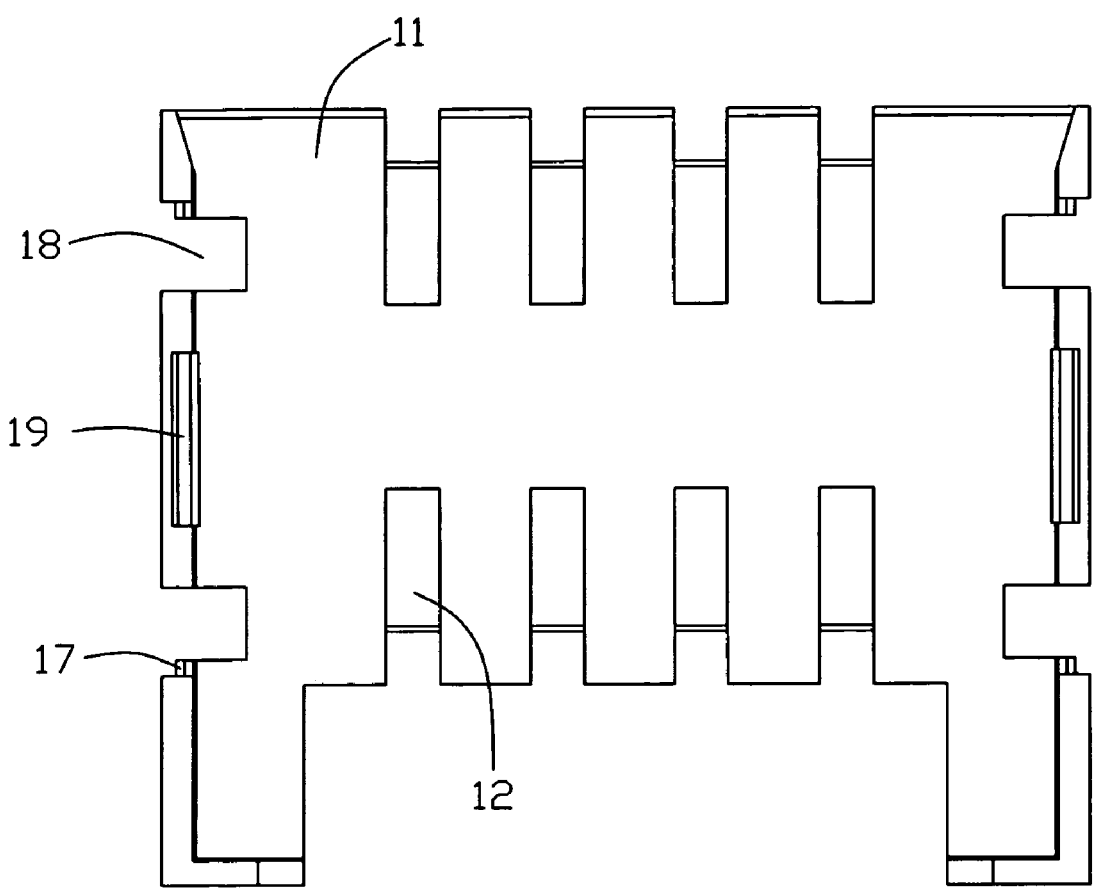
FIG. 3 is a platform of the electrical card connector shown in FIG. 1.

Referring to FIGS. 1-3, an electrical card connector 1 for connecting an electrical card (not shown) to a circuit board (not shown) in accordance with the preferred embodiment of the present invention comprises an insulative housing 10, a plurality of contacts 20 received in the insulative housing 10 and a pair of hooks 30 engages with the opposite sidewalls 14. The hooks 30 and the insulative housing 10 together define a receiving cavity 50 for receiving the electrical card.

The insulative housing 10 comprises a main body 11, a pair of sidewalls 14 and a rear wall 16. The main body 11 is in the form of general flat rectangular body, the sidewalls 14 and the rear wall 16 extend upwardly from three edges thereon. A plurality of passageways 12 having the slot portion 121 for receiving contacts 20 are disposed on the opposite sides of the main body 11 therein. Each sidewall 14 defines a notch portion 19 on the surface that face to the receiving cavity 50. On the two ends of the sidewalls' upper surface, a pair of openings 18 runs through from the top down, a platform 19 is defined adjacent to the top of the opening 18.

A plurality of contacts 20 is mounted within the passageways 12 of the insulative housing 10. Each contact 20 includes a contact portion 201 for contacting a printed circuit board, a retention portion 203 for helping to stabilize contacts 20, a soldering portion 204 for soldering contacts 20 onto the printed circuit board. The soldering portion 204 bends downwardly and is defined at the end of the retention portion 203. In addition, the contact portion 201 and the retention portion 203 are connected by the spring portion 202. When the contacts 20 received in the corresponding passageways 12, the side surfaces of the slot portion 121 put the pressure onto the retention portion 203 so as to make the engagement between contacts 20 and the passageways 12 stable.

Figure 4:
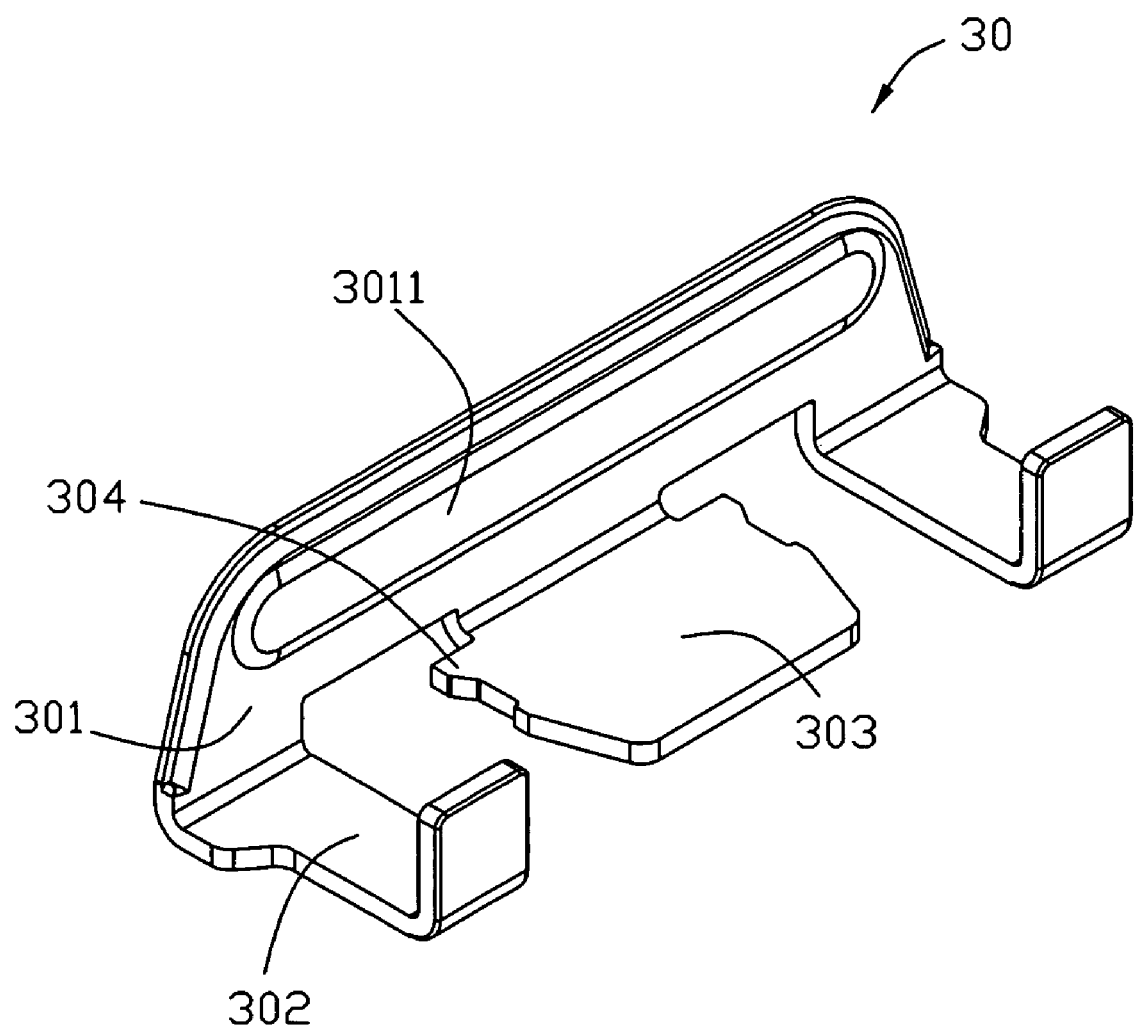
FIG. 4 is an enlarged view of the hook shown in FIG. 1.

Referring to FIG. 4, each hook 30 comprises a planar portion 301, a curved portion 302 and an engaging portion 303, wherein the two ends of the planar portion 301 bending and extending downwardly define a curved portion 302. The engaging portion 303 bending and extending downwardly from the middle part of the planar portion 301 is located at the same side with the curved portion 302. The curved portion 302 and the engaging portion 303 cooperate with the opening 18 and the notch portion 19 in harmony respectively for together stabilizing the hooks 30. The planar portion 301 defines a protrusion 3011 on the undersurface. When the hooks 30 are mounted on the insulative housing 10, the planar portion 301 is located upon the main body 11, the protrusion 3011 could fix the electrical card which received in the receiving cavity 50 for better.

The two ends of engaging portion 303 protrude and form a tab portion 304, during the process of inserting the engaging portion 303 into the notch portion 19, the tab portion 304 can be used as supporting surface for easily regulating the depth of insertion.

The platform 17 in the opening 18 supports the planar portion 301 in order to enhance the retention between the hook 30 and the insulative housing 10, when the hook 30 and the insulative housing 10 mounted together, it will be easy to regulate the depth of inserting hook 30 into insulative housing 10 via cooperation of the engaging portion 303 with the notch portion 19.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

While preferred embodiment in accordance with the present invention have been shown and described, equivalent modifications and changes known to persons skilled in the art according to the spirit of the present invention are considered within the scope of the present invention as defined in the appended claims.

What is claimed is:

1. An electrical connector comprising:

an insulative housing defining a main body with two opposite side walls on two opposite lateral sides and a rear wall, said main body, said rear wall and said two side walls commonly defining a receiving cavity therein for receiving a card therein;

a plurality of contacts disposed in the housing with mating sections extending into the receiving cavity and mounting sections extending around a bottom face of the housing; and a pair of hooks vertically assembled to the corresponding side walls, respectively, each of said hook including a retention device latched to the corresponding side arm, and horizontal solder feet essentially coplanar with said mounting sections; wherein each of said side walls defines cutouts to allow the corresponding solder feet to vertically pass therethrough during assembling the hook to the side wall, and said hook cooperate with said housing to only allow the card to be inserted into the receiving cavity horizontally;

wherein supporting platforms define in the cutouts for supporting the planar portion of the hook;

wherein each of the cutouts extends into the main body of the housing;

wherein each of the supporting platforms defines a step respect to a top wall of the side wall; and wherein each of said hooks has an engaged portion extended downwardly to assemble into a notch portion of the corresponding side wall.

2. The electrical connector as recited in claim 1, wherein a section of the sidewall between first and second openings is substantially short than the rest, and substantially equal to the height of the supporting platform.

* * * * *